3,819,726
PREPARATION OF URUSHIOL FROM POISON IVY OR POISON OAK
Ranbirsingh G. Khurana, New York, N.Y., and Charles R. Dawson, Leonia, N.J., assignors to the United States of America as represented by the Secretary, Department of Health, Education, and Welfare
No Drawing. Filed July 24, 1972, Ser. No. 274,291
Int. Cl. C07c 39/08
U.S. Cl. 260—625                                                   8 Claims

ABSTRACT OF THE DISCLOSURE

A method for the preparation of urushiol from poison ivy or poison oak is disclosed. The method includes extraction with alcohol at low temperature and a second extraction with benzene, followed by chromatographic separation on a solid adsorbent. The method includes the use of a pure nitrogen atmosphere in all operations and the minimized use of elevated temperatures to avoid altering the structure of urushiol components.

BACKGROUND AND SUMMARY OF THE INVENTION

The present invention is related to the preparation of urushiol from poison ivy or poison oak. More particularly, the present invention is related to the preparation of urushiol in which chromatographic separation is employed in order to produce an essentially pure urushiol product. Such products are employed in the diagnosis and treatment of dermatitis resulting from contact with poison ivy or poison oak.

The term urushiol was first employed to name the oily irritant principle of the Japanese lac tree. Investigations with regard to the structure of urushiol have shown urushiol from the lac tree to be a mixture of alkyl and alkenyl-catechols, with all components having the carbon skeleton of 3-n-pentadecyl catechol. More recently, the term urushiol has been used to describe the toxic component of the poison ivy plant. It has been demonstrated, however, as reported by Sunthankar, S. V., and Dawson, C. R., *J. Am. Chem. Soc.*, 76, 5070 (1954) that the heteroolefinic components of the poison ivy and lac urushiols are not identical in structure or in composition. Thus the mixture of heteroolefinic catechols of poison ivy, or of poison oak, is designated herein as "urushiol."

"Urushiol" is a mixture of four catechols of similar structure but with variable stability. Three of the catechols have an unsaturated side chain and these catechols are progressively less stable than the saturated fourth component, 3-n-pentadecyl catechol, and thus more prone to polymerization and oxidation reactions as the degree of unsaturation in the side chain increases from one to three olefinic bonds. Aged samples of "urushiol" have variable compositions of these unsaturated components along with their polymers and oxidation products, depending upon the degree of prior exposure to air, water and light, as well as the presence of acidic or basic conditions and elevated temperatures. These unsaturated components of "urushiol" show a tendency to polymerize under acidic conditions and to oxidize under aerobic conditions, with oxidation being accelerated in an alkaline environment. These reactions lead to products of a polymeric nature and with a loss in aromaticity. For these reasons, it is advisable to avoid elevated temperatures and exposure to air during the preparation of "urushiol." In addition, it is preferable to employ freshly collected raw materials when extracting "urushiol" from plant sources. The procedure of isolation and purification of "urushiol" in accordance with the present invention takes these factors into account.

The method of preparation of urushiol from poison ivy or poison oak in accordance with the present invention in general employs a sequence of steps which includes an initial extraction with an alcohol, such as ethyl alcohol, followed by a chilling and concentration of the alcoholic extract prior to transfer of the active components into benzene. The "urushiol" product is then isolated by means of chromatographic separation, and further purification may be accomplished by either of two methods, depending upon the scale of operation. Thus, in preparing 500 milligrams or less of pure "urushiol," a purification procedure of preparative thin layer chromatography is recommended. To prepare larger amounts, such as one to two grams of pure "urushiol," a second column chromatography on a silicic acid composition is recommended. In the method of the present invention, low temperatures are employed throughout, thus minimizing the use of elevated temperatures to avoid side reactions that structurally alter the "urushiol" components. In the initial extraction with alcohol, for example, the method of the present invention employs low temperature extraction at about 4° C. Also the use of benzene as the second extractant allows the use of a lower temperature in this step since benzene is more volatile than extractants such as xylene and thus may be removed at lower temperatures. The use of benzene is also advantageous in that the two phase aqueous alcohol-benzene system separates more rapidly and effectively than previous systems including components such as xylene. An additional feature of the method of the present invention is the use of pure nitrogen in all operations to avoid aerobic oxidation.

The method of the present invention provides yields of "urushiol" in the range of 1.2–1.7 grams per pound of raw material which is in the order of four to seven times higher than yields reported by previous methods. An important aspect of the present method is the isolation and purification of "urushiol" by chromatographic methods. The discovery, in accordance with the present method, that "urushiol" and each of its four components in their free phenolic and allergenically active forms, can be chromatographically separated on a solid adsorbent, preferably a silicic acid composition, was critical to the development of these new isolation and purification techniques.

It is preferred to employ a silicic acid composition which will minimize oxidative side reactions during processing and which contains a low level of metallic and metallic oxide impurities, in order to obtain a final "urushiol" product in high yields and purity. A particular silicic acid which has been used with good results is the silicic acid manufactured by Mallinckrodt Chemical Works and known as Mallinckrodt silicic acid. The maximum content of impurities listed for Mallinckrodt silicic acid is as follows:

|   | Wt. percent |
|---|---|
| (1) Chloride | 0.01 |
| (2) Heavy metals | 0.002 |
| (3) Iron | 0.001 |
| (4) Nonvolatile material (with HF) | 0.20 |
| (5) Loss on drying | 5.0 |
| (6) Loss on ignition | 16.0 |

It is important to note that the "urushiol" provided by the method of the present invention is pure or 100% "urushiol" as judged by all criteria now available as compared with the "urushiol" isolated and purified by vacuum distillation which is found to be contaminated to the extent of 10 to 15% with non-urushiol substances. Such contamination was not recognizable until chromatographic criteria of homogeneity were applied.

The method of the present invention is illustrated by the following example. While the example involves the preparation of poison ivy urushiol, an essentially similar procedure is followed in preparing poison oak urushiol.

A 20 lb. supply of freshly collected poison ivy raw material (vines, twigs and leaves) was cut into pieces about 2″ in length and covered with about 20 gallons (71 liters) of 95% ethyl alcohol in a plastic drum having a cover and petcock drain valve. The cover has provision for suitable inlet and outlet tubes to permit the bubbling of a slow stream of pure nitrogen gas through the alcohol system, thus providing a nitrogen atmosphere during the extraction period of 72 hours at 4° C. (cold room). The system was stirred occasionally during the alcohol extraction period.

The greenish brown alcohol extract was drained off and filtered through cheesecloth or fluted filter paper. The clarified extract was concentrated in 2 liter batches to 1/10 the original volume using a rotary evaporator under vacuum (water pump) in a water bath at 50–55° C. A capillary tube directed into the evaporator provided for a continuous flow of $N_2$ gas through the system during the concentration. The dark green concentrate thus obtained was then chilled for 24 hours at 4° C. during which time small amounts of a black sticky tarry material were deposited.

After filtration through fluted filter papers, the dark green concentrate (in 500 ml. batches) was extracted two or three times with benzene under a nitrogen atmosphere until no more color was removed (about 4 volumes of benzene were required). The dark reddish-brown mother liquor was discarded, and the dark green benzene extract was washed twice with distilled water to remove all water soluble components. The benzene was then removed using a rotary evaporator under the same conditions of vacuum, temperature, and $N_2$ atmosphere as described above for the alcohol extraction step. The last traces of benzene and water were removed under increased vacuum (5 mm.) at 50–55° C., to yield a crude poison ivy urushiol in the form of a greenish-brown viscous oil (usually about 6 g. per 500 ml. batch of the alcoholic concentrate).

A slurry of 120 g. silicic acid [1] in 500 ml. of ligroin (b.p. 70–90° C.) was employed to pack, over a cotton plug, a chromatographic column having dimensions of 51 x 4.2 cm. The column was suitably connected to a source of pure nitrogen to provide a continuous nitrogen atmosphere during the chromatography. An approximately 5 g. sample of the crude poison ivy urushiol from the above benzene extract was dissolved in about 10 ml. of ligroin and introduced at the top of the column. The column was then developed and eluted with the solvents listed in Table I at a flow rate of 15–20 drops per minute. Each solvent, in the indicated volume, was collected as a fraction, and the residue weight was determined by evaporation of the solvent under the rotary evaporator conditions described above. The data in Table I were obtained in a typical experiment involving a 5.2 g. sample of the crude poison ivy urushiol.

TABLE I.—COLUMN CHROMATOGRAPHY OF CRUDE POISON IVY URUSHIOL

| Fraction No. | Solvent composition | Vol. of solvent ml. | Residue wt. of fraction,[1] g. | $FeCl_3$[2] test |
|---|---|---|---|---|
| 1 | Ligroin (70–90°) | 3,000 | 1.30 | Negative. |
| 2 | 5% ethylacetate in ligroin. | 3,500 | 2.50 | Positive (blue-black). |
| 3 | 10% ethylacetate | 2,000 | 0.50 | Delayed (brown-black). |

[1] Approximately 0.9 g. of greenish-black material (presumably chlorophyll and polymerized products) showing a negative $FeCl_3$ test (non-catecholic) remains on the column. Elution with solvents of higher polarity (acetic acid, or ethylacetate, or methanol, etc.) will recover these contaminants from the column.
[2] A 1% solution of $FeCl_3$ (anhydrous) in distilled water is used to spray an approximately 1 mg. spot of the residue on filter paper, or on a silica gel TLC plate.

A sample of Fraction 1 (approximately 1 mg.) when spotted on a silica gel TLC plate, and developed ascending with a ligroin-ethyl acetate solvent (100:25 by volume) and then sprayed with the $FeCl_3$ reagent, showed no spots (no catecholic or "urushiol" substances). Subsequent spraying with concentrated $H_2SO_4$ revealed several spots (3 or 4) all having a higher $R_f$ value than poison ivy urushiol, the $R_f$ value of purified poison ivy urushiol under these conditions being 0.331.

A sample of Fraction 2, when similarly spotted and developed on a silica gel TLC plate and sprayed with the $FeCl_3$ reagent, showed an immediate and prominent bluish-black spot, corresponding to the $R_f$ value of poison ivy urushiol. Three minor additional spots of slightly lower and higher $R_f$ values and different color (yellowish-brown) were also observed, indicating the presence of small amounts of impurities in this "urushiol" fraction.

A sample of Fraction 3, when similarly spotted, developed, and sprayed with the $FeCl_3$ reagent, showed no poison ivy urushiol content. After 3 to 4 hours, however, a delayed reaction developed resulting in approximately 3 brownish-black spots of very low $R_f$ values.

The poison ivy urushiol of Fraction 2 can be made chromatographically pure (single TLC spot) by either of two methods, depending on the scale of operation. To prepare 500 mg. or less of pure "urushiol" a procedure of preparative thin layer chromatography is recommended. To prepare larger amounts, such as 1 or 2 grams of pure "urushiol" a second column chromatography procedure on silicic acid is advisable.

In the preparative thin layer chromatography procedure a 500 mg. sample of the Fraction 2 residue from the initial chromatography step was dissolved in 0.5 ml. of ethyl acetate and was spotted on a line in the usual manner on a Silica Gel plate having dimensions of 20 x 20 cm. The plate was then developed to 14 cm. height with an ascending solvent of ligroin-ethyl acetate (100:25 by volume). After a short period of air drying (about ½ hour), a limited marginal area of the plate was sprayed with the $FeCl_3$ reagent to reveal the "urushiol" position by an intense and immediate blue-black coloration. In the marginal area immediately below the "urushiol" position, a somewhat delayed (about an hour) faintly blue $FeCl_3$ coloration developed. Subsequent examination of the substances in this area reveal 2 or 3 contaminants of lower $R_f$ value than "urushiol." The silica gel material on the unsprayed area of the plate, lateral to and corresponding to the "urushiol"-$FeCl_3$ blue-black color, was removed by scraping and eluted with pure ethyl acetate. After removal of the solvent, the 350 mg. of oily residue was found to be chromatographically pure poison ivy urushiol as revealed by a single spot chromatogram on a silica gel TLC plate.

In carrying out the alternative procedure for purification, involving a second column chromatography procedure, a 2.0 g. sample of the Fraction 2 residue from the intial column chromatography step was dissolved in 2.0 ml. of pure ligroin and introduced at the top of a 40 x 3 cm. column containing 60 g. of silicic acid of the type employed initially. The rechromatography was then carried out at a flow rate of 15–20 drops per minute under a nitrogen atmosphere as previously described and twenty fractions were collected. Each of the fractions 1 through 20 was spotted on a TLC plate, developed with ethyl acetate-ligroin (30:100) and then sprayed with methanolic $FeCl_3$ solution. The fractions showing the same spots of similar $R_f$ values were combined as shown below in Table II.

TABLE II

| Fractions | | Weight of combined fraction residue, g. | $n_D^{25°}$ |
|---|---|---|---|
| A | (1, 2) | 0.3900 | |
| B | (3, 4, and 5) | 0.9262 | 1.5189 |
| C | (6, 7, 8 and 9) | 0.1060 | 1.5086 |
| D | (10, 11, 12 and 13) | 0.2549 | 1.5085 |
| E | (14, 15, 16 and 17) | 0.2006 | |
| F | (18, 19 and 20) | 0.1053 | |
| Total | | 1.9830 | |

[1] Silicic acid, No. 2847, 100 mesh (powder), $SiO_2$ x $H_2O$, analytical reagent (10% aqueous slurry—pH 4); Mallinckrodt Chemical Works, St. Louis, Mo.

Each of the combined fractions was again spotted on a TLC plate, developed, and sprayed with FeCl₃ solution. The results are summarized below:

Fraction A—Two yellow colored spots (negative FeCl₃ test).
Fraction B—One dark black spot, corresponding to "urushiol" in $R_f$ value.
Fraction C—Two dark black spots; one having the same $R_f$ value as "urushiol," the second having an $R_f$ value lower than "urushiol."
Fraction D—Three prominent spots; one dark black ("urushiol"), a second (light black) of lower $R_f$ value and a third (violet-black) of still lower $R_f$ value.
Fraction E—Same as Fraction D.
Fraction F—Three black spots having still lower $R_f$ values than the spots of fractions D and E.

From the above fraction information, it is apparent that 926 mg. of pure poison ivy urushiol (Fraction B, $n_D^{25°}$—1.5189), as judged by single spot thin layer chromatography, was recovered from the 2.0 g. sample of "urushiol" resulting from the first chromatography column (about 46% recovery). It is also apparent that significant amounts of "urushiol" were in Fractions C, D and E. The "urushiol" in these fractions could have been purified by further application of the above chromatographic methods, if it had been desired.

It is thought that the invention and many of its attendant advantages will be understood from the foregoing description, and it will be apparent that various changes may be made in the disclosed method without departing from the spirit and scope of the invention or sacrificing all of its material advantages, the example hereinbefore described being merely a preferred embodiment thereof.

It is claimed:

1. A method for the preparation of urushiol having a high degree of purity from the plant parts of poison ivy or poison oak which comprises:
    (a) extracting with ethyl alcohol at a temperature of about 4° C. a plant selected from the group consisting of poison ivy and poison oak;
    (b) extracting with benzene the extract obtained from the alcohol extraction to produce a crude urushiol;
    (c) subjecting the crude urushiol from the benzene extraction to chromatographic separation on a solid silicic acid adsorbent; and
    (d) recovering the urushiol from the adsorbent, a nitrogen atmosphere being employed throughout all operations.

2. The method of claim 1 wherein the chromatographic separation comprises a column chromatography procedure.

3. The method of claim 2 wherein the silicic acid contains no more than 0.002 weight percent of heavy metals and no more than 0.001 weight percent of iron.

4. The method of claim 1 wherein the alcohol extraction is carried out with 95% ethyl alcohol.

5. The method of claim 1 wherein the urushiol product of the chromatographic separation is subjected to a second chromatographic separation.

6. The method of claim 5 wherein the second chromatographic separation comprises a thin layer chromatography procedure.

7. The method of claim 5 wherein the second chromatographic separation comprises a column chromatography procedure on a silicic acid adsorbent.

8. The method of claim 7 wherein the silicic acid contains no more than 0.002 weight percent of heavy metals and no more than 0.001 weight percent of iron.

References Cited

McNair, "J. Amer. Chem. Soc.," vol. 43: 159–164 (1921).

Symes et al., "J. Amer. Chem. Soc.," vol. 76: 2959–2963 (1954).

Sunthankar et al., "J. Amer. Chem Soc.," vol. 76: 5070–5073 (1954).

Hill, "JACS," vol. 56 (1934), pp. 2736–2738.

BERNARD HELFIN, Primary Examiner

W. B. LONE, Assistant Examiner